US010486569B2

(12) United States Patent
Bieven et al.

(10) Patent No.: US 10,486,569 B2
(45) Date of Patent: Nov. 26, 2019

(54) MOTOR VEHICLE SEAT HEADREST

(71) Applicant: TESCA France, Paris (FR)

(72) Inventors: Franck Bieven, Paris (FR); David Ganier, Guignicourt (FR)

(73) Assignee: TESCA France, Paris (FR)

( * ) Notice: Subject to any disclaimer, the term of this patent is extended or adjusted under 35 U.S.C. 154(b) by 0 days.

(21) Appl. No.: 15/766,932

(22) PCT Filed: Sep. 29, 2016

(86) PCT No.: PCT/FR2016/052488
§ 371 (c)(1),
(2) Date: Apr. 9, 2018

(87) PCT Pub. No.: WO2017/060589
PCT Pub. Date: Apr. 13, 2017

(65) Prior Publication Data
US 2018/0297499 A1 Oct. 18, 2018

(30) Foreign Application Priority Data

Oct. 9, 2015 (FR) ..................................... 15 59636

(51) Int. Cl.
*B60N 2/879* (2018.01)
*B60N 2/58* (2006.01)
(Continued)

(52) U.S. Cl.
CPC ........... *B60N 2/879* (2018.02); *B60N 2/5841* (2013.01); *B60N 2/5883* (2013.01);
(Continued)

(58) Field of Classification Search
CPC .......... A47C 7/72; A47C 7/727; B60N 2/879; B60N 2/5883; B60N 2/6009;
(Continued)

(56) References Cited

U.S. PATENT DOCUMENTS

| 4,638,884 | A | * | 1/1987 | Lee ........................ | H04R 5/023 |
| | | | | | 181/141 |
| 8,130,987 | B2 | * | 3/2012 | Kaneda .................... | H04R 1/26 |
| | | | | | 381/301 |

(Continued)

OTHER PUBLICATIONS

International Search Report for PCT/FR2016/052488 dated Dec. 23, 2016.

*Primary Examiner* — Milton Nelson, Jr.
(74) *Attorney, Agent, or Firm* — Bachman & LaPointe, P.C.

(57) ABSTRACT

A headrest comprising a mounting frame on a backrest of a seat, a mounting structure for a loudspeaker, the structure being associated in the upper portion of the frame, the loudspeaker associated with the structure, a block of elastically compressible padding material covering the structure, the block being provided with a conduit configured to allow the sound emitted by the loudspeaker to propagate, a covering cover fitted over the block, the cover being provided with an orifice positioned facing the conduit, a grating for covering the orifice, the grating comprising a peripheral overhang covering a peripheral strip of the cover extending at the periphery of the orifice, a thickness of the padding material extending in alignment with the strip, the headrest further comprising a washer configured to stiffen the strip, the washer having an internal periphery of geometry analogous to that of the orifice, the overhang extending facing the washer.

10 Claims, 3 Drawing Sheets

(51) Int. Cl.
*B60N 2/60* (2006.01)
*B60R 11/02* (2006.01)
*B60R 11/00* (2006.01)
*B60N 2/80* (2018.01)

(52) U.S. Cl.
CPC ........ *B60N 2/6009* (2013.01); *B60R 11/0217* (2013.01); *B60N 2002/899* (2018.02); *B60R 2011/0017* (2013.01); *B60R 2011/0071* (2013.01)

(58) Field of Classification Search
CPC ............ B60N 2/5841; B60N 2002/899; B60R 2011/0017; B60R 11/0217; B60R 2011/0071
USPC ................................................ 297/217.4, 391
See application file for complete search history.

(56) References Cited

U.S. PATENT DOCUMENTS

| | | | |
|---|---|---|---|
| 2014/0270322 A1 | 9/2014 | Silverstein | |
| 2014/0355783 A1* | 12/2014 | Subat | B60N 2/879 381/86 |
| 2015/0043961 A1* | 2/2015 | Suzuki | H04R 1/023 403/217 |
| 2015/0201260 A1 | 7/2015 | Oswald et al. | |

* cited by examiner

MOTOR VEHICLE SEAT HEADREST

BACKGROUND OF THE INVENTION

The invention relates to a headrest for a motor vehicle seat.

It is known to carry out a headrest for a motor vehicle seat, said headrest comprising:
- a mounting frame on a backrest of said seat,
- a mounting structure for a loudspeaker, said structure being associated in the upper portion of said frame,
- said loudspeaker associated with said structure,
- a block of elastically compressible padding material covering said structure, said block being provided with a conduit intended to allow the sound emitted by said loudspeaker to propagate, said conduit opening on the one hand towards said loudspeaker and on the other hand outwards,
- a covering cover fitted over said block, said cover being provided with an orifice positioned facing said conduit,
- a grating for covering said orifice, said grating comprising a peripheral overhang covering a peripheral strip of said cover extending at the periphery of said orifice, a thickness of said padding material extending in alignment with said strip.

Due to the fact that the cover is fitted over the block of padding, there is no adhesion between the two.

This results in that the orifice is able to be deformed in relation to its nominal configuration, in particular when the finger of a child is inserted between the overhang and the peripheral strip, which could lead to a situation wherein the block can appear around the grating, with the aesthetic defect that results therefrom.

It is known in prior art to provide an absence of padding material in alignment with the peripheral strip, the mounting structure coming in contact with said strip, which makes it possible to fasten said strip to said structure and as such prevent any deformation of the orifice in relation to its nominal configuration.

However, in the case where a thickness of the padding material extends in alignment with the peripheral strip, such an arrangement cannot be implemented.

SUMMARY OF THE INVENTION

The invention has for purpose to propose an arrangement that makes it possible to guarantee a blocking of the orifice in its nominal configuration in such a situation.

To this effect, the invention proposes a headrest for a motor vehicle seat, said headrest comprising:
- a mounting frame on a backrest of said seat,
- a mounting structure for a loudspeaker, said structure being associated in the upper portion of said frame,
- said loudspeaker associated with said structure,
- a block of elastically compressible padding material covering said structure, said block being provided with a conduit intended to allow the sound emitted by said loudspeaker to propagate, said conduit opening on the one hand towards said loudspeaker and on the other hand outwards,
- a covering cover fitted over said block, said cover being provided with an orifice positioned facing said conduit,
- a grating for covering said orifice, said grating comprising a peripheral overhang covering a peripheral strip of said cover extending at the periphery of said orifice, a thickness of said padding material extending in alignment with said strip,
- said headrest further comprising a washer for stiffening of said strip, said washer having an internal periphery of geometry analogous to that of said orifice, said overhang extending facing said washer.

When it is said that a thickness of padding material extends in alignment with the strip, this means that a layer of said material extends facing the rear face of said strip.

With the arrangement proposed, the orifice is blocked in its nominal configuration by the washer for stiffening, which makes it possible to prevent any risk of the padding block appearing around the grating.

BRIEF DESCRIPTION OF THE DRAWINGS

Other particularities and advantages of the invention shall appear in the following description, given in reference to the attached figures, wherein.

DETAILED DESCRIPTION

Figure 1:
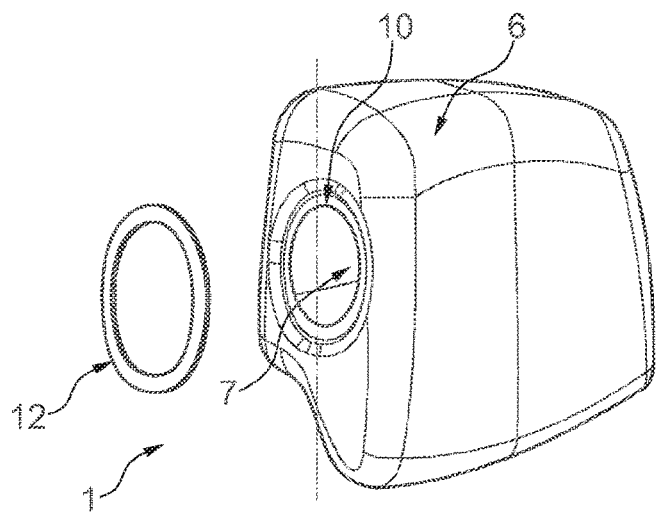
FIG. 1 is a diagrammatical view in partial exploded perspective of a headrest according to an embodiment.

In reference to the figures, a headrest 1 for a motor vehicle seat is described, said headrest comprising:
- a mounting frame—in particular with a metal tube base folded in the general shape of an inverted U—on a backrest of said seat,
- a mounting structure 2—in particular made of moulded plastic material—for a loudspeaker 3, said structure being associated in the upper portion of said frame,
- said loudspeaker associated with said structure,
- a block 4 of elastically compressible padding material—said block being in particular with a moulded plastic base and being in particular a flexible polyurethane foam—covering said structure, said block being provided with a conduit 5 intended to allow the sound emitted by said loudspeaker to propagate, said conduit opening on the one hand towards said loudspeaker and on the other hand outwards,
- a covering cover 6—in particular with a fabric or leather base—fitted over said block, said cover being provided with an orifice 7 positioned facing said conduit,
- a grating 8 for covering said orifice, said grating comprising a peripheral overhang 9 covering a peripheral strip 10 of said cover extending at the periphery of said orifice, with a thickness 11 of said padding material extending in alignment with said strip, said headrest further comprising a washer for stiffening 12 of said strip, said washer having an internal periphery of geometry analogous to that of said orifice, said overhang extending facing said washer.

According to the embodiment shown, the washer 12 is associated with the rear side of the strip 10 in such a way that said strip is inserted between the overhang 9 and said washer.

According to an embodiment, the washer 12 has a hardness greater than or equal to 50 shore.

According to the embodiment shown, the washer 12 is associated with the strip 10 by sewing 13 or, in an alternative not shown, by welding.

According to an embodiment, the washer 12 is made from moulded plastic material or from cardboard.

Figure 3:
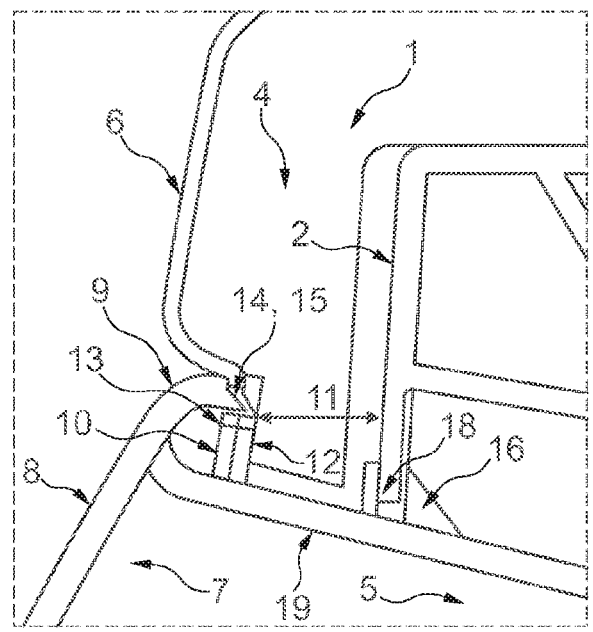
FIG. 3 is an enlargement of a detail of FIG. 2.
Figure 4:
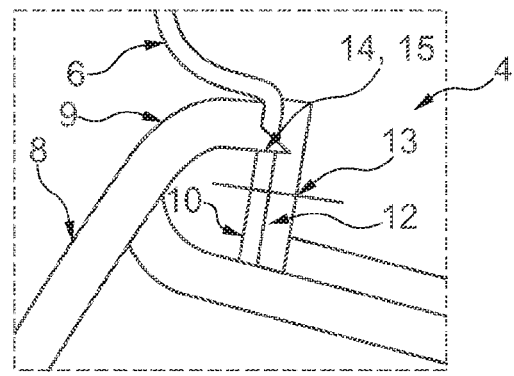
FIG. 4 is an enlargement of a detail of FIG. 3, FIGS. 5a and 5b are alternative embodiments of the arrangement shown in FIG. 4.

According to the embodiments shown in FIGS. 3 to 5, the washer 12 comprises a plurality of holes 14, with the overhang 9 being provided with a plurality of lugs 15 being introduced in said holes in such a way as to block the relative positioning between the grating 8 and the orifice 7.

Figure 5A:
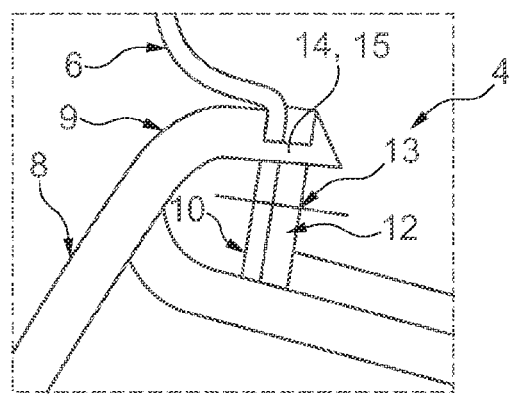
Figure 5B:
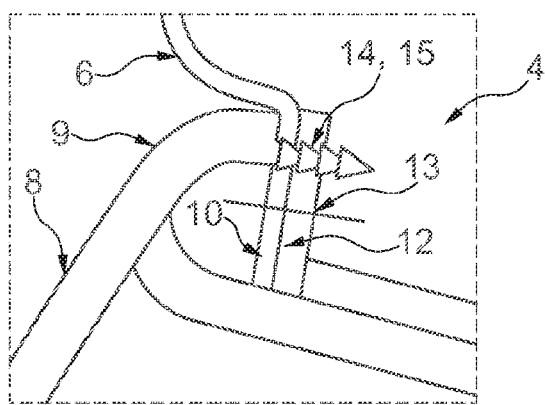

According to the embodiment shown in FIGS. 5a and 5b, the lugs 15 are harpoon shaped so as to prevent them from being removed once positioned in the holes 14.

Figure 2:
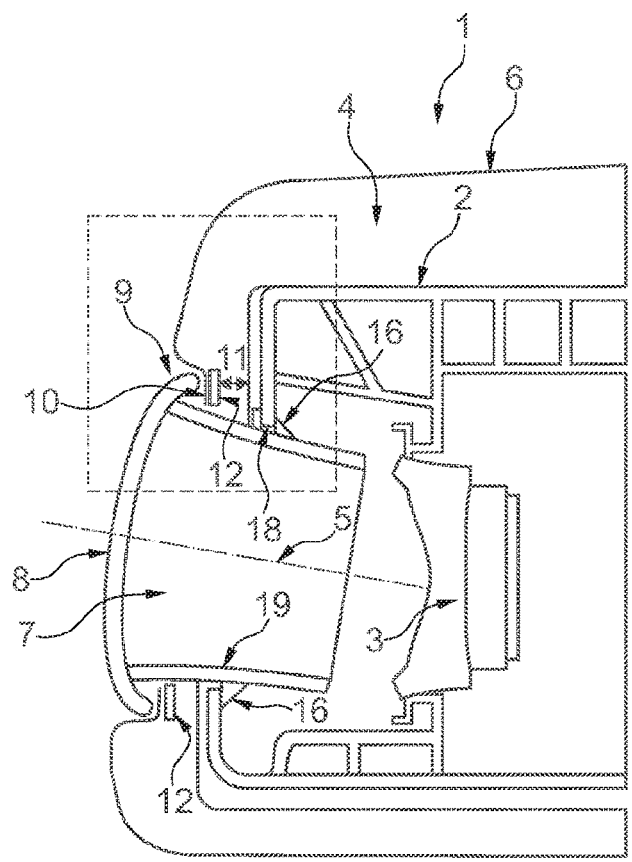
FIG. 2 is a partial cross-section diagrammatical view of the headrest of FIG. 1 assembled.

According to the embodiment shown in FIGS. 2 and 3, the grating 8 is extended by a tubular portion 19 for propagating the sound lining the conduit 5.

According to the embodiment shown in FIGS. 2 and 3, the grating is provided with means for fastening 16 to the mounting structure 2.

According to the embodiment shown in FIGS. 2 and 3, the means for fastening have the shape of harpoons—here coming from the portion 19—being anchored on stops 18 provided on the mounting structure 2.

The invention claimed is:

1. A headrest for a motor vehicle seat, said headrest comprising:
    a frame for mounting said headrest on a backrest of said seat,
    a mounting structure for a loudspeaker, said structure being associated in the upper portion of said frame,
    said loudspeaker associated with said structure,
    a block of elastically compressible padding material covering said structure, said block being provided with a conduit configured to allow the sound emitted by said loudspeaker to propagate, said conduit opening on one hand towards said loudspeaker and on another hand outwards,
    a covering cover fitted over said block, said cover being provided with an orifice positioned facing said conduit,
    a grating for covering said orifice, said grating comprising a peripheral overhang covering a peripheral strip of said cover extending at a periphery of said orifice, a thickness of said padding material extending in alignment with said strip, and
    said headrest further comprising a washer configured to stiffen said strip, said washer having an internal periphery of geometry analogous to that of said orifice, said overhang extending facing said washer.

2. The headrest according to claim 1, wherein the washer is associated at the rear side of the strip in such a way that said strip is inserted between the overhang and said washer.

3. The headrest according to claim 2, wherein the washer has a hardness greater than or equal to 50 shore.

4. The headrest according to claim 3, wherein the washer is associated with the strip by at least one of sewing and welding.

5. The headrest according to claim 4, wherein the washer is made from at least one of a moulded plastic material and cardboard.

6. The headrest according to claim 5, wherein the washer comprises a plurality of holes, the overhang being provided with a plurality of lugs being introduced in said holes in such a way as to block the relative positioning between the grating and the orifice.

7. The headrest according to claim 6, wherein the lugs are harpoon shaped so as to prevent them from being removed once positioned in the holes.

8. The headrest according to claim 7, wherein the grating is extended by a tubular portion for propagating a sound lining the conduit.

9. The headrest according to claim 8, wherein the grating is provided with means for fastening to the mounting structure.

10. The headrest according to claim 9, wherein the means for fastening have the form of harpoons that are anchored on stops provided on the mounting structure.

\* \* \* \* \*